(12) United States Patent
Yoshida et al.

(10) Patent No.: US 9,999,995 B2
(45) Date of Patent: Jun. 19, 2018

(54) METHOD FOR PRODUCING MOLDED ARTICLE OF FIBER-REINFORCED PLASTIC

(71) Applicants: HONDA MOTOR CO., LTD., Tokyo (JP); FUKUI PREFECTURAL GOVERNMENT, Fukui-shi, Fukui (JP)

(72) Inventors: Shuichiro Yoshida, Wako (JP); Keiichi Kondo, Fukui (JP)

(73) Assignees: HONDA MOTOR CO., LTD., Tokyo (JP); FUKUI PREFECTURAL GOVERNMENT, Fukui-Shi (JP)

(*) Notice: Subject to any disclaimer, the term of this patent is extended or adjusted under 35 U.S.C. 154(b) by 954 days.

(21) Appl. No.: 14/570,416

(22) Filed: Dec. 15, 2014

(65) Prior Publication Data

US 2015/0174836 A1    Jun. 25, 2015

(30) Foreign Application Priority Data

Dec. 20, 2013 (JP) ................................ 2013-263598

(51) Int. Cl.

| | |
|---|---|
| *B29C 70/54* | (2006.01) |
| *B29C 43/58* | (2006.01) |
| *B29C 35/02* | (2006.01) |
| *B29C 70/44* | (2006.01) |
| *C08L 63/00* | (2006.01) |
| *B29K 63/00* | (2006.01) |
| *B29K 307/04* | (2006.01) |
| *B29C 37/00* | (2006.01) |

(52) U.S. Cl.
CPC .......... *B29C 43/58* (2013.01); *B29C 35/0288* (2013.01); *B29C 70/44* (2013.01); *B29C 2037/90* (2013.01); *B29C 2043/5808* (2013.01); *B29C 2043/5816* (2013.01); *B29K 2063/00* (2013.01); *B29K 2307/04* (2013.01)

(58) Field of Classification Search
CPC ............ B29C 70/54; B29C 2043/5816; B29C 35/002; B29C 35/0288; B29C 2037/90

USPC ........................................................ 264/40.1
See application file for complete search history.

(56) References Cited

U.S. PATENT DOCUMENTS

| | | | | |
|---|---|---|---|---|
| 3,681,980 | A * | 8/1972 | Decker .................... | G01N 3/34 374/48 |
| 4,868,769 | A * | 9/1989 | Persson ................... | G01N 27/22 264/40.1 |
| 5,221,500 | A * | 6/1993 | Gent .................... | B29C 35/0288 264/40.1 |
| 8,278,389 | B2 * | 10/2012 | Tomioka ................. | B32B 27/38 428/36.4 |
| 9,376,560 | B2 * | 6/2016 | Yoshida ................. | C08L 63/00 |
| 9,670,356 | B2 * | 6/2017 | Yoshida ................. | C08L 63/00 |
| 2010/0209642 | A1 * | 8/2010 | Tomioka ................. | B32B 27/38 428/36.9 |

FOREIGN PATENT DOCUMENTS

| | | |
|---|---|---|
| JP | 2008-296494 | 12/2008 |
| SU | 1592768 A * | 9/1990 |

* cited by examiner

*Primary Examiner* — Atul P. Khare
(74) *Attorney, Agent, or Firm* — Rankin, Hill & Clark LLP

(57) ABSTRACT

A method for producing a molded article of a fiber-reinforced plastic include molding a fiber-resin mixture containing an inorganic reinforcing fiber and a thermosetting resin under heat and pressure. The elapsed time since the thermosetting resin reached a molding temperature at which a hardening reaction proceeds is measured, the loss angle δ of the thermosetting resin is measured in a dynamic viscoelasticity measurement, and the relationship between the elapsed time and the loss angle δ is evaluated to calculate the range of the elapsed time, within which the loss angle δ is 0.55 to 1.57 rad after the loss angle δ reached the maximum value, as the pressurization start range. The fiber-resin mixture is heated to the molding temperature and pressure application to the fiber-resin mixture is started within the pressurization start range, to obtain the molded article of the fiber-reinforced plastic.

5 Claims, 6 Drawing Sheets

FIG. 1

| MATRIX RESIN | FIRST RESIN (MY721) | SECOND RESIN (jER828) | THIRD RESIN (jER1001) | HARDENER (Aradur976-1) |
|---|---|---|---|---|
| a | 30 | 40 | 30 | 34 |
| b | 60 | 20 | 20 | 43 |
| c | 20 | 60 | 20 | 34 |
| d | 30 | 20 | 50 | 30 |

FIG. 3

| MOLDED FIBER-REINFORCED PLASTIC ARTICLE | LOSS ANGLE δ [rad] | PRESSURIZATION START TIME [min] | | | | FIBER VOLUME CONTENT Vf [%] | | | |
|---|---|---|---|---|---|---|---|---|---|
| | | a | b | c | d | a | b | c | d |
| C1 | 1.57 | 7.3 | 6.9 | 7.2 | 7.6 | 64.81 | 64.9 | 64.88 | 63.99 |
| C2 | 1.48 | 13.3 | 14.5 | 14.8 | 12.8 | 62.52 | 63.31 | 63.45 | 63.23 |
| C3 | 1.35 | 15.3 | 16.7 | 15.8 | 14.9 | 59.4 | 60.23 | 61.37 | 61.14 |
| C4 | 1.19 | 16 | 17.1 | 18.2 | 15.3 | 58.8 | 59.41 | 60.26 | 60.08 |
| C5 | 0.92 | 17 | 19.3 | 19.1 | 16.2 | 58.35 | 57.98 | 59.64 | 59.45 |
| C6 | 0.55 | 19 | 20.1 | 19.6 | 18.1 | 56.78 | 56.55 | 58.31 | 57.96 |
| C7 | 0.43 | 22.3 | 22.1 | 23.4 | 20.9 | 53.21 | 54.11 | 54.86 | 54.45 |

FIG. 4

| MOLDED FIBER-REINFORCED PLASTIC ARTICLE | LOSS ANGLE δ [rad] | DEFECT NUMBER [defects] | | | | PLATE THICKNESS [mm] | | | |
|---|---|---|---|---|---|---|---|---|---|
| | | a | b | c | d | a | b | c | d |
| C1 | 1.57 | 0 | 0 | 0 | 0 | 0.906 | 0.909 | 0.902 | 0.911 |
| C2 | 1.48 | 0 | 0 | 0 | 0 | 0.919 | 0.913 | 0.911 | 0.934 |
| C3 | 1.35 | 0 | 0 | 0 | 0 | 0.977 | 0.981 | 0.975 | 0.987 |
| C4 | 1.19 | 0 | 0 | 0 | 0 | 0.979 | 0.986 | 0.988 | 0.992 |
| C5 | 0.92 | 0 | 0 | 0 | 0 | 1.018 | 0.997 | 1.011 | 1.006 |
| C6 | 0.55 | 0 | 0 | 0 | 0 | 1.022 | 1.033 | 1.068 | 1.059 |
| C7 | 0.43 | 2 | 3 | 1 | 2 | 1.115 | 1.105 | 1.112 | 1.116 |

FIG. 5

| MOLDED FIBER-REINFORCED PLASTIC ARTICLE | LOSS ANGLE δ [rad] | PRESSURIZATION START TIME [min] | | | | FIBER VOLUME CONTENT Vf [%] | | | |
|---|---|---|---|---|---|---|---|---|---|
| | | a | b | c | d | a | b | c | d |
| G1 | 1.57 | 7.3 | 6.9 | 7.2 | 7.6 | 64.93 | 64.66 | 64.30 | 64.79 |
| G2 | 1.48 | 13.3 | 14.5 | 14.8 | 12.8 | 64.10 | 63.22 | 63.63 | 63.45 |
| G3 | 1.35 | 15.3 | 16.7 | 15.8 | 14.9 | 62.71 | 60.16 | 63.47 | 61.26 |
| G4 | 1.19 | 16 | 17.1 | 18.2 | 15.3 | 59.64 | 60.02 | 61.32 | 60.80 |
| G5 | 0.92 | 17 | 19.3 | 19.1 | 16.2 | 59.99 | 58.73 | 59.86 | 58.93 |
| G6 | 0.55 | 19 | 20.1 | 19.6 | 18.1 | 57.21 | 57.31 | 57.89 | 57.61 |
| G7 | 0.43 | 22.3 | 22.1 | 23.4 | 20.9 | 54.28 | 53.91 | 54.36 | 54.88 |

FIG. 6

| MOLDED FIBER-REINFORCED PLASTIC ARTICLE | LOSS ANGLE δ [rad] | DEFECT NUMBER [defects] | | | | PLATE THICKNESS [mm] | | | |
|---|---|---|---|---|---|---|---|---|---|
| | | a | b | c | d | a | b | c | d |
| G1 | 1.57 | 0 | 0 | 0 | 0 | 0.947 | 0.941 | 0.916 | 0.952 |
| G2 | 1.48 | 0 | 0 | 0 | 0 | 0.966 | 0.945 | 0.925 | 0.976 |
| G3 | 1.35 | 0 | 0 | 0 | 0 | 1.026 | 1.015 | 0.990 | 1.031 |
| G4 | 1.19 | 0 | 0 | 0 | 0 | 1.028 | 1.021 | 1.003 | 1.037 |
| G5 | 0.92 | 0 | 0 | 0 | 0 | 1.069 | 1.032 | 1.026 | 1.051 |
| G6 | 0.55 | 0 | 0 | 0 | 0 | 1.073 | 1.069 | 1.084 | 1.096 |
| G7 | 0.43 | 3 | 3 | 1 | 3 | 1.170 | 1.143 | 1.128 | 1.166 |

METHOD FOR PRODUCING MOLDED ARTICLE OF FIBER-REINFORCED PLASTIC

CROSS-REFERENCE TO RELATED APPLICATION

This application is based upon and claims the benefit of priority from Japanese Patent Application No. 2013-263598 filed on Dec. 20, 2013, the contents of which are incorporated herein by reference.

BACKGROUND OF THE INVENTION

Field of the Invention

The present invention relates to a method for producing a molded article of a fiber-reinforced plastic, comprising molding a fiber-resin mixture (composite material) containing an inorganic reinforcing fiber and a thermosetting resin under heat and pressure.

Description of the Related Art

A molded article of a fiber-reinforced plastic containing an inorganic reinforcing fiber and a thermosetting resin has a light weight and an excellent mechanical property such as strength or stiffness, and thus has been widely used in various fields. The molded fiber-reinforced plastic article can be produced via a prepreg, which is prepared by impregnating the inorganic reinforcing fiber with the thermosetting resin. The prepreg is attached to a mold and formed into a desired shape under heat and pressure by using an autoclave, a press, etc. Then, the thermosetting resin is hardened in this state to obtain the molded fiber-reinforced plastic article.

Examples of the inorganic reinforcing fibers include carbon fibers prepared by carbonizing a material such as an acrylic fiber or a pitch fiber at a high temperature, glass fibers prepared by melting an alkali-free glass such as a silica glass and by drawing the molten glass into a fibrous form, and ceramic fibers mainly composed of an alumina and a silica.

To produce the molded fiber-reinforced plastic article, the prepreg (prepared by impregnating the inorganic reinforcing fiber with the thermosetting resin) may be cut to a horizontal and vertical size of 150 mm or less, and the cut prepreg sheets may be randomly stacked. Alternatively, the thermosetting resin may be filled with a short fiber of the inorganic reinforcing fiber, or the thermosetting resin may be cast (injected) into a base material of the inorganic reinforcing fiber (particularly a woven fabric, a mat material, etc.) without impregnating the inorganic reinforcing fiber with the thermosetting resin.

Incidentally, to produce the molded fiber-reinforced plastic article with a desired mechanical property suitable for intended application, the volume ratio of the inorganic reinforcing fiber to the entire molded article (the fiber volume content Vf) has to be equal to a predetermined value. The fiber volume content Vf is selected depending on the orientation, weave, and filling form of the inorganic reinforcing fiber, the types of the inorganic reinforcing fiber and the matrix resin, the intended application of the molded article, or the like.

Therefore, when the actual fiber volume content Vf of the molded fiber-reinforced plastic article obtained by the above production process (hereinafter referred to also as the actual measured value) is different from the predetermined fiber volume content Vf (hereinafter referred to also as the predetermined value), the desired mechanical property cannot be achieved in some cases. For example, when the actual measured value is smaller than the predetermined value, the resultant molded fiber-reinforced plastic article may be insufficient in strength or stiffness. On the other hand, when the actual measured value is larger than the predetermined value, the molded fiber-reinforced plastic article may be insufficient in toughness. Thus, in either event, the molded fiber-reinforced plastic article may fail to have excellent mechanical property. Consequently, to produce the molded fiber-reinforced plastic article with the fiber volume content Vf equal to the predetermined value, it is necessary to control the process of molding a mixture containing the inorganic reinforcing fiber and the thermosetting resin (hereinafter referred to also as the fiber-resin mixture) under heat and pressure.

For example, in view of producing the molded fiber-reinforced plastic article with the controlled fiber volume content Vf, a method for preventing leakage of a resin from a fiber bundle in the process of heat-hardening a fiber-resin mixture is proposed in Japanese Laid-Open Patent Publication No. 2008-296494.

Specifically, a fiber bundle is impregnated with a first resin by a resin impregnation apparatus. Then, the first resin and the fiber bundle are covered with a second resin by a resin coating apparatus. The second resin has a viscosity higher than that of the first resin, and the second resin is hardened more rapidly than the first resin in the process of heat-hardening the fiber-resin mixture. As a result, the leakage of the first resin can be prevented, and the fiber volume content Vf can be controlled.

SUMMARY OF THE INVENTION

However, in the method described in Japanese Laid-Open Patent Publication No. 2008-296494, a complicated equipment having the resin impregnation apparatus, the resin coating apparatus, and the like is required, and a plurality of processes using the equipment are required to produce the molded fiber-reinforced plastic article. Thus, it is difficult to produce the molded fiber-reinforced plastic article efficiently with low cost in this method.

Furthermore, in this method, the first resin and the second resin having the higher viscosity than the first resin are used to prepare the matrix resin. Therefore, usable resins are limited in this method.

In addition, depending on the rates of the hardening reactions of the first and second resins in the process of press-molding the fiber-resin mixture, it is often difficult to control the fiber volume content Vf of the molded fiber-reinforced plastic article. Thus, in a case where the hardening reactions proceed at insufficient rates, because of high fluidities of the first and second resins, the first and second resins may be leaked from the fiber-resin mixture in the process of press-molding the fiber-resin mixture, whereby the resultant fiber volume content Vf may be larger than the predetermined value.

On the other hand, in a case where the hardening reactions proceed excessively, because of low fluidities of the first and second resins, the first and second resins are hardly moved in response to the deformation of the inorganic reinforcing fiber in the process of press-molding the fiber-resin mixture. In this case, a void (defect) or the like may be formed in the molded fiber-reinforced plastic article, whereby the resultant fiber volume content Vf may be smaller than the predetermined value.

Consequently, in view of accurately controlling the fiber volume content Vf, it is necessary to start the press molding of the fiber-resin mixture at the right time depending on the hardening reaction rates (fluidities) of the first and second resins. However, in a case where the first and second resins in the fiber-resin mixture exhibit different hardening reaction rates as in the method described in Japanese Laid-Open Patent Publication No. 2008-296494, it is difficult to determine the right time.

A principal object of the present invention is to provide a method for producing a molded article of a fiber-reinforced plastic, capable of starting press molding of a fiber-resin mixture containing an inorganic reinforcing fiber and a thermosetting resin at the right time, thereby controlling the fiber volume content Vf of the molded article easily, efficiently, and accurately.

According to an aspect of the present invention, there is provided a method for molding a fiber-resin mixture containing an inorganic reinforcing fiber and a thermosetting resin under heat and pressure, thereby producing a molded article of a fiber-reinforced plastic, comprising the steps of:

measuring the elapsed time since a temperature of the thermosetting resin or the fiber-resin mixture reached a molding temperature (at which a hardening reaction proceeds), measuring the loss angle δ of the thermosetting resin or the fiber-resin mixture in a dynamic viscoelasticity measurement, evaluating the relationship between the elapsed time and the loss angle δ, and calculating the range of the elapsed time, within which the loss angle δ is 0.55 to 1.57 rad after the loss angle δ reached the maximum value, as the pressurization start range based on the relationship, and heating the fiber-resin mixture to the molding temperature, and starting pressure application to the fiber-resin mixture while the elapsed time is within the pressurization start range.

The thermosetting resin is a viscoelastic material having a significant viscous elasticity, and the elastic element and the viscous element are changed with temperature. Specifically, at the temperature at which the hardening reaction proceeds (the molding temperature), it is likely that the viscous element is decreased and the elastic element is increased due to the hardening reaction, as the elapsed time since the temperature of the thermosetting resin or the fiber-resin mixture reached the molding temperature (hereinafter referred to also simply as the elapsed time) is increased. The loss tangent represents the ratio between the viscous and elastic elements, i.e. the ratio of the loss elastic modulus E" to the storage elastic modulus E' (tan δ=E"/E'), and the pressure application to the fiber-resin mixture is started while the loss angle δ is an appropriate value. Consequently, the fiber volume content Vf can be accurately controlled.

Thus, in the method of the present invention for producing the molded fiber-reinforced plastic article, the right time, at which the pressure application to the fiber-resin mixture is started, is determined based on the loss angle δ of the thermosetting resin measured at the molding temperature in the dynamic viscoelasticity measurement.

Specifically, after the loss angle δ reaches the maximum value at the molding temperature, the pressure application to the fiber-resin mixture is started within the elapsed time range corresponding to the loss angle δ of 0.55 to 1.57 rad. Since the pressure application to the fiber-resin mixture is started after the time corresponding to the loss angle δ of 0.55 rad, the thermosetting resin can be prevented from leaking from the inorganic reinforcing fiber in the process of press-molding the fiber-resin mixture, and thus the leaked portion can be prevented from hardening to form a burr or the like. Therefore, the thermosetting resin is not removed in the form of the burr or the like, and the volume of the thermosetting resin in the molded fiber-reinforced plastic article is not reduced. Consequently, the fiber volume content Vf can be prevented from becoming larger than a predetermined value.

Furthermore, because the pressure application to the fiber-resin mixture is started before the time corresponding to the loss angle δ of 1.57 rad has passed, the thermosetting resin can be moved in response to the deformation of the inorganic reinforcing fiber in the process of press-molding the fiber-resin mixture. Consequently, the inorganic reinforcing fiber is sufficiently impregnated with the thermosetting resin in the resultant molded fiber-reinforced plastic article, so that the fiber volume content Vf can be prevented from becoming smaller than a predetermined value due to formation of a void (defect) or the like.

As a result, in the method for producing the molded fiber-reinforced plastic article, the fiber volume content Vf can be accurately controlled within the range of the predetermined value ±5%.

In addition, because the elapsed time range satisfying the above loss angle δ condition is calculated in the thermosetting resin in the fiber-resin mixture, and the pressure application to the fiber-resin mixture is started within the elapsed time range, the fiber volume content Vf of the molded fiber-reinforced plastic article can be highly accurately controlled. Thus, in the method for producing the molded fiber-reinforced plastic article, various fiber-resin mixtures can be suitably used, and the molded fiber-reinforced plastic article can be easily produced with the accurately controlled fiber volume content Vf.

Consequently, the pressure application to the fiber-resin mixture containing the inorganic reinforcing fiber and the thermosetting resin can be started at the right time, and the fiber volume content Vf of the molded fiber-reinforced plastic article can be controlled easily, efficiently, and accurately in the production.

It is preferred that an epoxy resin is used as the thermosetting resin from the viewpoints of strength, heat resistance, and the like.

The epoxy resin preferably contains 20 to 60 phr of a first resin, 20 to 60 phr of a second resin, and 20 to 50 phr of a third resin. The first resin is a polyfunctional glycidylamine-type epoxy resin represented by the following structural formula (1), the second resin is a viscous liquid of a bisphenol A-type epoxy resin represented by the following structural formula (2), and the third resin is a solid of a bisphenol A-type epoxy resin represented by the following structural formula (2).

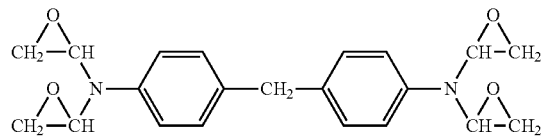
(1)

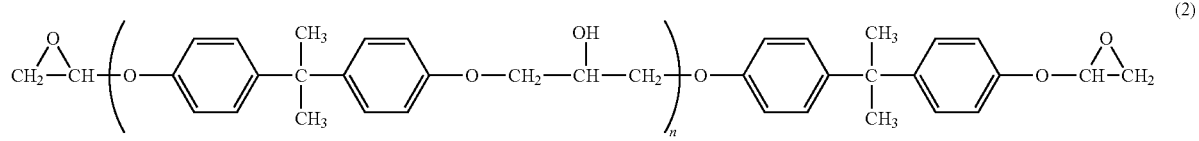
(2)

The term "phr (per hundred resin)" represents the weight ratio of each resin to 100 of the total epoxy resin.

A hardener may be added to the epoxy resin. In this case, the hardener is preferably an aromatic polyamine represented by the following structural formula (3).

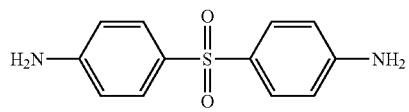
(3)

When the molded fiber-reinforced plastic article is produced from the fiber-resin mixture containing the inorganic reinforcing fiber and the epoxy resin with the hardener of the aromatic polyamine while accurately controlling the fiber volume content Vf, the resultant molded article can exhibit further improved mechanical property and heat resistance. Therefore, the molded article can be suitably used as an aircraft member.

It is preferred that a carbon fiber or a glass fiber is used as the inorganic reinforcing fiber. When the molded fiber-reinforced plastic article is produced from the fiber-resin mixture containing the thermosetting resin and the carbon or glass fiber while accurately controlling the fiber volume content Vf, the resultant molded article can exhibit excellent properties such as low density, high strength, and high elasticity. Therefore, also in this case, the molded article can be suitably used as an aircraft member or the like.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a table showing composition ratios of first to third resins and a hardener in matrix resins a to d used in an embodiment of the present invention;

FIG. 3 is a table showing seven pressurization start times for each of the matrix resins a to d determined based on the loss angles δ, and the fiber volume contents Vf of molded fiber-reinforced plastic articles C1 to C7 produced by starting pressure application to a fiber-resin mixture C containing a carbon fiber as an inorganic reinforcing fiber at each pressurization start time;

FIG. 4 is a table showing the numbers of defects detected by a non-destructive test and the plate thickness measurement results of the molded fiber-reinforced plastic articles C1 to C7 shown in FIG. 3;

FIG. 5 is a table showing seven pressurization start times for each of the matrix resins a to d and the fiber volume contents Vf of molded fiber-reinforced plastic articles G1 to G7 produced by performing pressure application to a fiber-resin mixture G containing an alkali-free glass fiber as an inorganic reinforcing fiber; and FIG. 6 is a table showing the numbers of defects and the plate thicknesses of the molded fiber-reinforced plastic articles G1 to G7 shown in FIG. 5.

DESCRIPTION OF THE PREFERRED EMBODIMENTS

Figure 2:
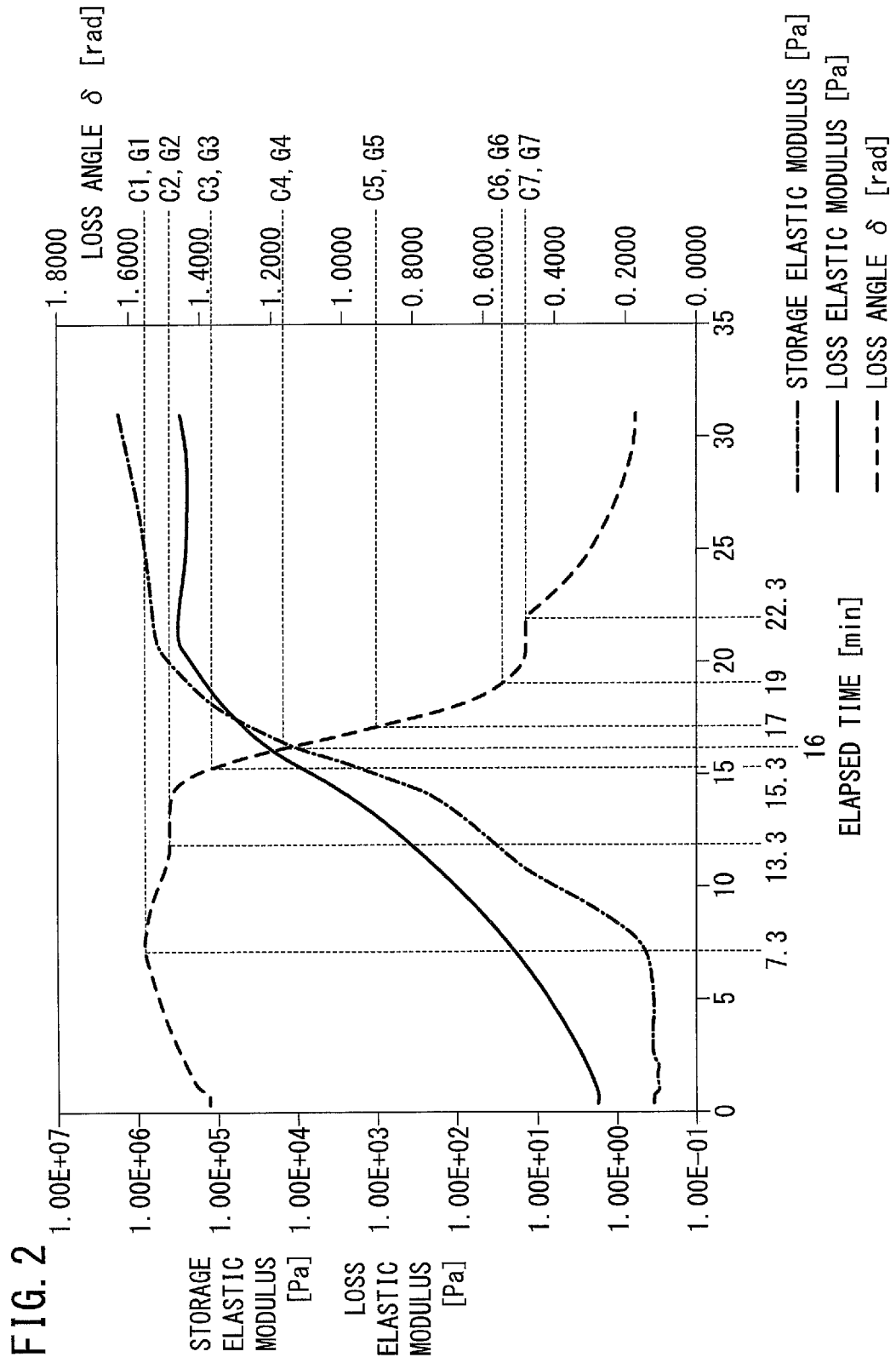
FIG. 2 is a graph showing the relationship, obtained by dynamic viscoelasticity measurement of the matrix resin a at a molding temperature, between the elapsed time (min) since the resin temperature reached the molding temperature, the storage elastic modulus E' (Pa) and the loss elastic modulus E" (Pa), and the loss angle δ (rad)

A preferred embodiment of the molded fiber-reinforced plastic (FRP) article production method of the present invention will be described in detail below with reference to the accompanying drawings.

In the production method of the present invention, a molded article of a fiber-reinforced plastic can be produced from a fiber-resin mixture, which is prepared by impregnating an inorganic reinforcing fiber with a matrix resin containing a thermosetting resin. For example, it is preferred that an epoxy resin is used as the thermosetting resin from the viewpoint of improving the strength, heat resistance, and the like of the molded fiber-reinforced plastic article. Therefore, in the following example of this embodiment, the epoxy resin is used as the thermosetting resin, and a hardener is added to the epoxy resin to prepare the matrix resin. The matrix resin is not particularly limited thereto.

Specifically, in this example, the epoxy resin in the matrix resin contains 20 to 60 phr of a first resin, 20 to 60 phr of a second resin, and 20 to 50 phr of a third resin.

The first resin is a polyfunctional glycidylamine-type epoxy resin represented by the following structural formula (1). A commercially available product such as Araldite MY 721 (trade name, available from Huntsman Advanced Materials) may be used as the resin.

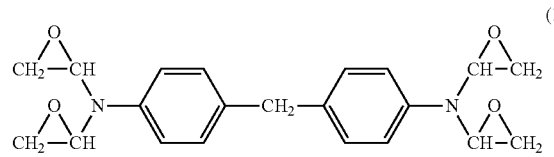

The second resin is a viscous liquid of a bisphenol A-type epoxy resin represented by the following structural formula (2). A commercially available product such as jER828 (trade name, available from Mitsubishi Chemical Corporation) may be used as the resin. The third resin is a solid of a bisphenol A-type epoxy resin represented by the following structural formula (2). A commercially available product such as jER1001 (trade name, available from Mitsubishi Chemical Corporation) may be used as the resin.

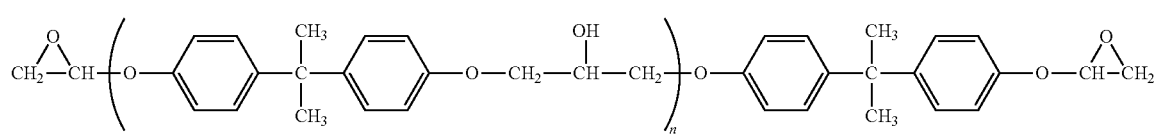

Whether the bisphenol A-type epoxy resin represented by the structural formula (2) is in the state of the viscous liquid (the second resin) or the solid (the third resin) depends on n (the number of the repeating units) in the structural formula (2) and the environmental temperature.

The hardener to be added to the epoxy resin is not limited as long as it can act to harden the epoxy resin. It is preferred that an aromatic polyamine is used as the hardener from the viewpoint of improving the mechanical property and the heat resistance of the molded fiber-reinforced plastic article. Preferred examples of the aromatic polyamines include 4,4-diaminodiphenylsulfone represented by the following structural formula (3). A commercially available product such as Aradur 976-1 (trade name, available from Huntsman Advanced Materials) may be used as the aromatic polyamine.

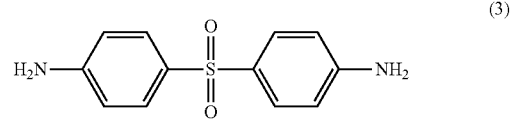 [SMILES: Nc1ccc(S(=O)(=O)c2ccc(N)cc2)cc1]

Incidentally, Araldite, jER, and Aradur are registered trademarks.

The ratio of the hardener to the epoxy resin may be selected depending on the epoxy equivalent of the epoxy resin. For example, in a case of using the above aromatic polyamine as the hardener, the ratio may be determined such that the number of active hydrogen groups calculated from the amine equivalent of the hardener is equal to the number of epoxy groups calculated from the epoxy equivalent of the epoxy resin.

Examples of the inorganic reinforcing fibers to be impregnated with the matrix resin include carbon fibers prepared by carbonizing a material such as an acrylic fiber or a pitch fiber at a high temperature, glass fibers prepared by melting an alkali-free glass such as a silica glass and by drawing the molten glass into a fibrous form, and ceramic fibers mainly composed of an alumina and a silica.

For example, in a case where the molded fiber-reinforced plastic article is used as an aircraft member or the like, it is preferred that a PAN-based carbon fiber is used as the inorganic reinforcing fiber from the viewpoint of achieving excellent properties such as low density, high strength, and high elasticity. The PAN-based carbon fiber is obtained by carbonizing a PAN (polyacrylonitrile) fiber at a high temperature. A commercially available product such as T800SC (trade name, available from Toray Industries, Inc., having a tensile strength of 5880 MPa, a tensile elastic modulus of 294 GPa, and a density of 1.8 g/cm$^3$) may be used as the carbon fiber.

A plurality of bundles of the inorganic reinforcing fiber are arranged parallel to each other to prepare a Uni-Directional (UD) material. The UD material is impregnated with the unhardened matrix resin to prepare a prepreg sheet as the fiber-resin mixture. Alternatively, a plurality of the inorganic reinforcing fiber bundles or a fabric of the inorganic reinforcing fiber woven horizontally and vertically, triaxially, or multiaxially may be impregnated with the unhardened matrix resin to prepare a prepreg as the fiber-resin mixture. Alternatively, a prepreg prepared by impregnating the inorganic reinforcing fiber with the thermosetting resin may be cut to a horizontal and vertical size of 150 mm or less, and the cut prepreg sheets may be randomly stacked to prepare the fiber-resin mixture.

In a case where a UD material containing the inorganic reinforcing fiber is impregnated with the matrix resin to prepare a prepreg (the fiber-resin mixture), and the molded fiber-reinforced plastic article is produced as the aircraft member or the like from the prepreg, the molded article preferably has a fiber volume content Vf of 60%. The fiber volume content Vf is the volume ratio of the inorganic reinforcing fiber to the entire molded article.

In the production method of this embodiment, the molded fiber-reinforced plastic article can be produced with a controlled fiber volume content Vf of 60%±5%. This example will be described below. The fiber volume content Vf may be appropriately selected depending on the intended application of the molded article, the orientation of the inorganic reinforcing fiber, the types of the inorganic reinforcing fiber and the matrix resin, or the like.

First, dynamic viscoelasticity measurement of the matrix resin (the thermosetting resin) is carried out at a molding temperature of 150° C., at which a hardening reaction can proceed. The molding temperature is selected depending on the type of the hardener added to the epoxy resin, etc. In general, the molding temperature is a temperature suitable for molding the thermosetting resin.

The relationship between the elapsed time since the temperature of the matrix resin reached the molding temperature and the loss angle $\delta$ is evaluated from the results of the dynamic viscoelasticity measurement. Then, the range of the elapsed time, within which the loss angle $\delta$ is 0.55 to 1.57 rad after the loss angle $\delta$ reached the maximum value, is calculated as the pressurization start range based on the relationship.

The dynamic viscoelasticity measurement of a matrix resin a containing first to third resins and a hardener at ratios shown in FIG. 1 is carried out at the molding temperature (150° C.). The results are shown in FIG. 2. The pressurization start range will be specifically described below with reference to FIG. 2.

As shown in FIG. 1, the matrix resin a is prepared by adding 34 phr of the hardener to the epoxy resin containing 30 phr of the first resin, 40 phr of the second resin, and 30 phr of the third resin. The term "phr" means the weight ratio of each component to 100 of the total epoxy resin containing the first to third resins.

The dynamic viscoelasticity measurement of FIG. 2 is carried out using Physica MCR 301 (trade name, available from Anton Paar) under a frequency of 1 Hz and an oscillation angle $\gamma$ of 10% (36 deg).

The matrix resin a has a thermosetting property as described above, and the hardening reaction proceeds with the elapsed time. As shown in FIG. 2, before the elapsed time reaches approximately 18 minute (corresponding to the gelation point), the storage elastic modulus E' is smaller than the loss elastic modulus E", and the viscous element is larger than the elastic element. On the other hand, after the elapsed time reaches approximately 18 minute, the storage elastic modulus E' is larger than the loss elastic modulus E", and the elastic element is larger than the viscous element.

When the ratio between the viscous and elastic elements changing with the elapsed time reaches an appropriate value, pressure application to the fiber-resin mixture is started. The fiber volume content Vf of the molded fiber-reinforced plastic article can be accurately controlled in this manner as described hereinafter.

The change of the ratio between the elastic and viscous elements with the elapsed time can be evaluated using the loss angle $\delta$ in the loss tangent representing the ratio of the loss elastic modulus E" to the storage elastic modulus E' (tan $\delta$=E"/E'). The range of the elapsed time, within which the loss angle $\delta$ is 0.55 to 1.57 rad after the loss angle $\delta$ reaches the maximum value, i.e. the elapsed time range of 7.3 to 19 minutes, is appropriately used as the pressurization start range of the matrix resin a as described hereinafter.

After the pressurization start range of the matrix resin is calculated in the above manner, the UD material is impregnated with the matrix resin to prepare the fiber-resin mixture suitable for achieving the fiber volume content Vf of 60%. The fiber-resin mixture is molded under heat and pressure to produce the molded fiber-reinforced plastic article. In this process, the pressure application to the fiber-resin mixture is started while the elapsed time (since the temperature of the fiber-resin mixture reached the molding temperature) is within the pressurization start range.

More specifically, a plurality of sheets of the fiber-resin mixture are stacked, placed on a metal plate mold, and formed into a desired shape. The metal plate mold and the fiber-resin mixture are enclosed in an airtight bag. The bag has a degassing port, and the inside of the bag can be evacuated by removing the internal gas through the port. The port of the bag is sealed in the vacuum state, and the bag is placed in a furnace of an autoclave. The fiber-resin mixture in the bag can be molded under heat and pressure in the autoclave in accordance with a predetermined molding program.

For example, the fiber-resin mixture is heated to the molding temperature and maintained in this state in the furnace of the autoclave. The elapsed time since the temperature of the fiber-resin mixture reached the molding temperature is measured, and the inner pressure of the autoclave furnace is increased at the elapsed time within the pressurization start range. As described above, when the ratio between the viscous and elastic elements is changed to the appropriate value, the pressure application to the fiber-resin mixture can be started to mold the fiber-resin mixture into the desired shape.

Therefore, the matrix resin can be prevented from leaking from the inorganic reinforcing fiber in the process of press-molding the fiber-resin mixture, and thus the leaked portion can be prevented from hardening to form a burr or the like. Furthermore, the matrix resin can be moved in response to deformation of the inorganic reinforcing fiber in the process of press-molding the fiber-resin mixture. Consequently, the inorganic reinforcing fiber can be sufficiently impregnated with the matrix resin in the resultant molded fiber-reinforced plastic article, and formation of a void (defect) or the like can be prevented.

After the molding of the fiber-resin mixture under the above pressure application, the furnace is maintained at a temperature suitable for accelerating the hardening reaction of the matrix resin to sufficiently harden the matrix resin. The molded fiber-reinforced plastic article having the desired shape can be obtained in this manner.

As described above, the matrix resin leakage and the burr formation are prevented in the molded fiber-reinforced plastic article. Therefore, volume reduction of the matrix resin can be prevented in the molded article. Furthermore, the void (defect) or the like is not formed in the molded article. Therefore, the volume increase of the matrix resin can be prevented in the molded article. Thus, the fiber volume content Vf can be prevented from increasing or decreasing from the predetermined value of 60%.

The pressurization start range of the matrix resin a was calculated in the above manner, the matrix resin a was used together with the UD material containing the inorganic reinforcing fiber as the carbon fiber T800SC (trade name, available from Toray Industries, Inc.) to prepare a fiber-resin mixture C, molded fiber-reinforced plastic articles C1 to C7 were produced from the fiber-resin mixture C, and the fiber volume contents Vf (actual measured values) of the molded articles C1 to C7 were measured.

Specifically, the pressure application to the fiber-resin mixture C was started at each of pressurization start times corresponding to seven loss angles δ shown in FIG. 2, whereby seven plates of the molded fiber-reinforced plastic articles C1 to C7 were produced respectively. Then, the fiber volume contents Vf (actual measured values), the defect numbers, and the plate thicknesses of the molded articles C1 to C7 were measured respectively.

First, in view of producing the plates of the molded fiber-reinforced plastic articles C1 to C7 having horizontal and vertical sizes of 100 mm×100 mm and a desired thickness (predetermined thickness) of 1 mm, the carbon fiber (UD material) was impregnated with the matrix resin a to prepare the fiber-resin mixture C. The fiber-resin mixture C was enclosed in the vacuum bag and placed in the furnace of the autoclave as described above. The furnace was heated to the molding temperature of 150° C. and maintained for 1 hour at this temperature. During this period of 1 hour, the inner pressure of the furnace was increased to mold the fiber-resin mixture C at each of the pressurization start times corresponding to the molded fiber-reinforced plastic articles C1 to C7. Thus, the molding pressure application to the fiber-resin mixture C was started when the elapsed time reached each of the seven pressurization start times shown in FIG. 2.

Then, the furnace in the autoclave was heated to 180° C. and maintained for 2 hours at this temperature, whereby the matrix resin a was sufficiently hardened to produce each of the seven plates of the molded fiber-reinforced plastic articles C1 to C7. In a case where a burr was formed on the molded articles C1 to C7 taken from the furnace, the burr was cut by a cutter to obtain the horizontal and vertical sizes of 100 mm×100 mm.

The fiber volume contents Vf of the molded fiber-reinforced plastic articles C1 to C7 were measured in accordance with JIS K 7075. The results are shown in FIG. 3. Furthermore, the molded fiber-reinforced plastic articles C1 to C7 were subjected to a non-destructive test using an ultrasonic flaw detector (5 MHz). The numbers of defects having a maximum length of 5 mm or more (the defect numbers) were measured in the non-destructive test, and the plate thicknesses were measured using a micrometer. The results are shown in FIG. 4. In FIGS. 3 and 4 and FIGS. 5 and 6 to be hereinafter described, "a" represents the matrix resin a, and "b" to "d" represent matrix resins b to d to be hereinafter described.

As is clear from FIG. 3, in the molded fiber-reinforced plastic articles C1 to C6, the pressurization start times were within the elapsed time range of 7.3 to 19 minutes corresponding to the loss angles δ of 0.55 to 1.57 rad, whereby the actual measured values of the fiber volume contents Vf were within the range of the predetermined value 60%±5%. Thus, the molded articles C1 to C6 could be produced with accurately controlled fiber volume contents Vf. Furthermore, in the molded articles C1 to C6, the defect numbers were 0, and the actual measured values of the plate thicknesses were within the range of the desired plate thickness 1 mm±10%.

In contrast, in the molded fiber-reinforced plastic article C7, the pressurization start time was the elapsed time of 22.3 minutes corresponding to the loss angle δ of 0.43 rad, whereby the actual measured value of the fiber volume content Vf was 53.21. Thus, the fiber volume content Vf of the molded article C7 was out of the range of the predetermined value 60%±5%. Furthermore, in the molded article C7, the defect number was 2, and the actual measured value of the plate thickness was 1.115 mm, out of the range of the desired plate thickness 1 mm±10%.

Thus, by starting the pressure application to the fiber-resin mixture while the elapsed time at the molding temperature is within the pressurization start range (in which the loss angle δ is 0.55 to 1.57 rad after the loss angle δ reached the maximum value), the molded fiber-reinforced plastic article using the matrix resin a can be produced with the accurately controlled fiber volume content Vf. In addition, the formation of the defect such as the void can be prevented in the molded article, and the actual measured value of the plate thickness can be prevented from being out of the range of the predetermined value ±10%.

The dynamic viscoelasticity measurement of each of the matrix resins b to d containing the first to third resins and the hardener at ratios shown in FIG. 1 was carried out at the molding temperature (150° C.) in the same manner as the matrix resin a. The pressure application to the fiber-resin mixture C was started at each of the obtained pressurization start times corresponding to seven loss angles δ shown in FIG. 3, whereby seven plates of the molded fiber-reinforced plastic articles C1 to C7 were produced respectively. Then, the fiber volume contents Vf (actual measured values), the defect numbers, and the plate thicknesses of the molded articles C1 to C7 using the matrix resins b to d were measured respectively in the same manner as the molded articles C1 to C7 using the matrix resin a. The results of the fiber volume content Vf measurement are shown in FIG. 3, and the results of the defect number measurement and the plate thickness measurement are shown in FIG. 4.

As shown in FIGS. 3 and 4, though the matrix resins b to d had different compositions, the matrix resins b to d had the results similar to those of the matrix resin a. Thus, by starting the pressure application to the fiber-resin mixture while the elapsed time is within the pressurization start range (in which the loss angle δ is 0.55 to 1.57 rad after the loss angle δ reached the maximum value), the molded fiber-reinforced plastic articles using the matrix resins b to d can be produced with the accurately controlled fiber volume contents Vf. In addition, the formation of the defect such as the void can be prevented in the molded articles, and the actual measured values of the plate thicknesses can be prevented from being out of the range of the predetermined value ±10%.

Then, each of the above matrix resins a to d was used together with a UD material containing, as the inorganic reinforcing fiber, an alkali-free glass fiber ERS3550-222 (trade name, having a thread size of 3550 g/1000 m, available from Central Glass Fiber Co., Ltd.) to prepare a fiber-resin mixture G, molded fiber-reinforced plastic articles G1 to G7 were produced from the fiber-resin mixture G, and the fiber volume contents Vf (actual measured values) of the molded articles G1 to G7 were measured.

The fiber-resin mixture G had the same composition as the fiber-resin mixture C except for using the alkali-free glass fiber instead of the carbon fiber, and was prepared in the same manner as the fiber-resin mixture C. The seven molded fiber-reinforced plastic articles G1 to G7 using each of the matrix resins a to d were produced from the fiber-resin mixture G in the same manner as the production of the molded fiber-reinforced plastic articles C1 to C7 from the fiber-resin mixture C. The results of the fiber volume content Vf measured with respect to the molded articles G1 to G7 are shown in FIG. 5, and the results of the defect number and the plate thickness measured are shown in FIG. 6.

As shown in FIGS. 5 and 6, in the molded fiber-reinforced plastic articles G1 to G6 using each of the matrix resins a to d, the pressurization start times were within the elapsed time range of 7.3 to 19 minutes corresponding to the loss angles δ of 0.55 to 1.57 rad, whereby the actual measured values of the fiber volume contents Vf were within the range of the predetermined value 60%±5%. Furthermore, in the molded articles G1 to G6, the defect numbers were 0, and the actual measured values of the plate thicknesses were within the range of the desired plate thickness 1 mm±10%.

In contrast, in the molded fiber-reinforced plastic article G7, the pressurization start time was the elapsed time of 22.3 minutes corresponding to the loss angle δ of 0.43 rad, whereby the fiber volume content Vf was out of the range of the predetermined value 60%±5%. Furthermore, in the molded article G7, the defect number was 1 or more, and the actual measured value of the plate thickness was out of the range of the desired plate thickness 1 mm±10%.

Thus, the molded fiber-reinforced plastic articles using the alkali-free glass fiber as the inorganic reinforcing fiber had the results similar to those of the molded articles using the carbon fiber.

As described above, in the production method of the present invention comprising molding the fiber-resin mixture containing the inorganic reinforcing fiber and the thermosetting resin under heat and pressure, various fiber-resin mixtures containing various inorganic reinforcing fibers and various matrix resins can be suitably used, and the molded fiber-reinforced plastic article can be easily produced with the accurately controlled fiber volume content Vf. In addition, the defect number, thickness ununiformity, and the like can be effectively reduced in the process of molding the fiber-resin mixture under heat and pressure, whereby the molded fiber-reinforced plastic article can be produced with high quality.

The present invention is not particularly limited to the above embodiment, and various changes and modifications may be made therein without departing from the scope of the invention.

What is claimed is:

1. A method of producing a molded article of a fiber-reinforced plastic, the method comprising the steps of:
   heating a first thermosetting resin to a molding temperature at which a hardening reaction of the first thermosetting resin proceeds;
   maintaining the first thermosetting resin at the molding temperature while the hardening reaction of the first thermosetting resin proceeds;
   during said maintaining of the first thermosetting resin at the molding temperature:
     measuring loss angle δ of the first thermosetting resin;
     measuring an elapsed time since reaching the molding temperature, the measured loss angle δ reaching a maximum value during the elapsed time;
     identifying the maximum value for the loss angle δ reached during said elapsed time; and
     after the loss angle δ reaches the maximum value, calculating a range of the elapsed time within which the loss angle δ is 0.55 to 1.57 rad, the calculated range being defined as a pressurization start range;
   forming a fiber-resin mixture comprising an inorganic reinforcing fiber and a second thermosetting resin that is the same material as the first thermosetting resin;
   heating the fiber-resin mixture to the molding temperature, a hardening reaction of the second thermosetting resin proceeding at the molding temperature;
   maintaining the fiber-resin mixture at the molding temperature while the hardening reaction of the second thermosetting resin proceeds; and
   starting pressure application to the fiber-resin mixture at a time during said maintaining of the fiber-resin mixture at the molding temperature after reaching the molding temperature that is within the pressurization start range.

2. The method according to claim 1, wherein the first thermosetting resin is an epoxy resin.

3. The method according to claim 2, wherein:
   the epoxy resin contains 20 to 60 phr of a first resin, 20 to 60 phr of a second resin, and 20 to 50 phr of a third resin,
   the first resin is a polyfunctional glycidylamine-type epoxy resin represented by the following structural formula (1):

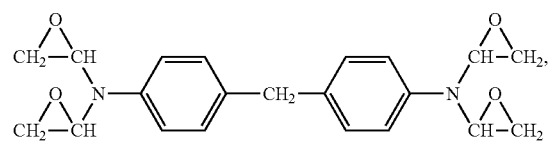

the second resin is a viscous liquid of a bisphenol A-type epoxy resin represented by the following structural formula (2):

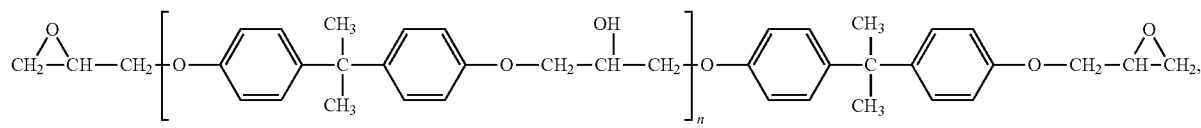

the third resin is a solid of a bisphenol A-type epoxy resin represented by the structural formula (2), and the viscous liquid state of the second resin and the solid state of the third resin are provided by selecting an appropriate value of 'n' for each of the second and third resins.

4. The method according to claim 2, wherein an additive of an aromatic polyamine represented by the following structural formula (3):

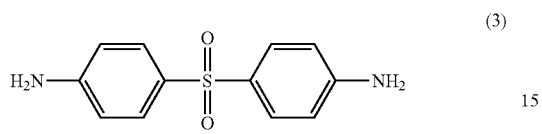

(3)

is added to the epoxy resin.

5. The method according to claim 1, wherein the inorganic reinforcing fiber is a carbon fiber or a glass fiber.

* * * * *